Sept. 27, 1960  G. H. HOLOUBEK ET AL  2,953,819

METHOD OF CASTING PLASTIC ARTICLES HAVING INTEGRAL SHEEN

Filed May 18, 1959  2 Sheets-Sheet 1

GEORGE H. HOLOUBEK
HARLAND E. HARMS
BY
Mazzell, Johnston, Cook & Root
ATT'YS

INVENTORS:
GEORGE H. HOLOUBEK
HARLAND E. HARMS

ATT'YS

United States Patent Office 2,953,819
Patented Sept. 27, 1960

2,953,819

METHOD OF CASTING PLASTIC ARTICLES HAVING INTEGRAL SHEEN

George H. Holoubek and Harland E. Harms, Muscatine, Iowa, assignors to The Celon Company, Madison, Wis., a corporation of Wisconsin Filed May 18, 1959, Ser. No. 813,907

7 Claims. (Cl. 18—58)

This invention relates to a new and improved method of casting plastic articles having integral sheen or pearly luster.

Various plastic substances and pigment materials referred to as pearl essence have been employed together in the production of plastic articles having integral sheen, the articles also being described as pearly or imitation mother-of-pearl, nacreous, silky, metallic and so forth. The sheen is imparted to the plastic by light-reflecting lamellae and more particularly, natural and synthetic pearl essence, which lamellae are dispersed throughout and form an integral feature of the article, in contrast to merely surface treatments. Natural pearl essence is obtained from fish scales, and the particles are often referred to as "guanine" crystals. Numerous inorganic and organic lamellae are used as synthetic pearl essence, as is well known, including lead carbonate, zinc carbonate, aluminum bronze, gold bronze, mercurous chloride, lead iodide, lead acid arsenate, bismuth salts, ammonium phosphates of manganese, magnesium and zinc, and other organic and inorganic light-reflecting crystalline materials such as described in U.S. Patent 2,555,224.

Cast pearlescent plastic articles are conventionally prepared by intimately mixing a hardenable plastic material with the light-reflecting lamellae, in the fluid state of the plastic, conditions are imposed to produce more or less orientation of the lamellae in the mass, and the plastic material is hardened. Employing a light-transmitting plastic material, cast articles are produced which give the appearance of mother-of-pearl and are useful for various decorative applications such as in buttons, articles of jewelry, table service and other uses where a pearl finish is desired.

A number of methods have been proposed for producing desirable orientation of the light-reflecting lamellae and maintaining the orientation until the plastic material gels and fixes the position of the particles. However, the processes are often more complicated and time consuming than desired, or special equipment is required, and control of quality is difficult.

The object of the present invention is to provide a method of casting plastic articles having integral sheen which produces products having high luster and pearlescent appearance.

A particular object is to provide a method producing controlled orientation of the light-reflecting lamellae, in a simple, effective and reproducible manner.

A further object is to provide a method of casting pearlescent plastic articles wherein the orientation of the pigment particles is controlled by the application of a voltage to the mixture of plastic material and pigment.

Another object is to provide a method of casting plastic articles having integral sheen wherein particle orientation or alignment is produced when the mixture of plastic and pigment is in fluid state, and maintained until gelation or initial solidification takes place to secure the pigment particles in their oriented positions.

An additional object is to provide a method of casting pearlescent articles such as sheets, rods and the like which may be employed as stock for the manufacture of various articles, or for casting articles directly in the form in which they will be used, as in the case of buttons and decorative articles.

These and other objects, advantages and functions of the invention will be apparent on reference to the specification and to the attached drawings, in which like reference characters identify like parts in each of the views, and in which.

Figure 1:
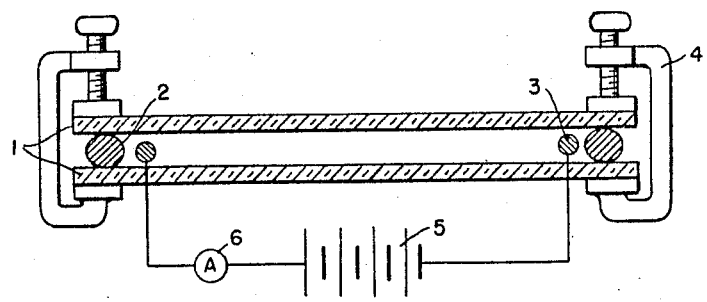
Figure 1 is a view in plan and in horizontal section of a cell for casting plastic sheets and means for producing orientation of the pigment particles.
Figure 2:
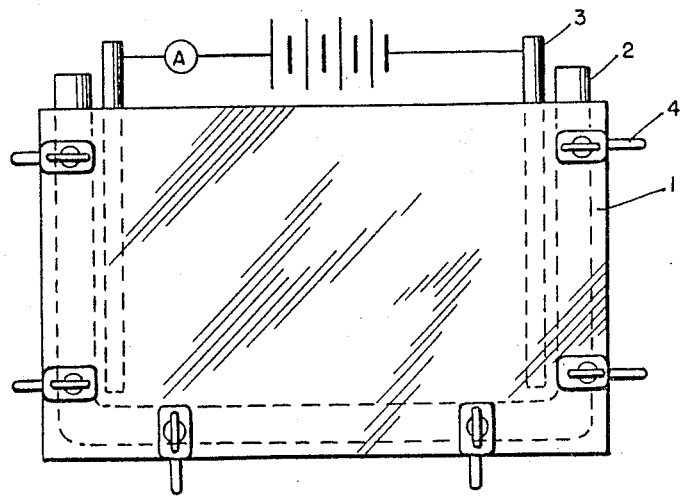
Figure 2 is a side elevation of the cell.

It has now been discovered in accordance with the invention that exceptional luster and pearlescent appearance is produced by applying a direct current voltage to a fluid mass of plastic material and dispersed light-reflecting lamellae, and maintaining the voltage until the dispersion gels or sets. The applied voltage produces an orientation, alignment, or regular arrangement of the pigment particles, and the orientation is retained in the solid articles. When the plastic material reaches a semi-solid or solid state as represented by a gel stage or flaccid state, or is further hardened, the pigment particles are held in position physically by the plastic material and the electromotive force across the mixture is withdrawn. When the article is hardened or cured to a suitable degree, it may be used or further processed in the manufacture of various articles.

The new method produces plastic articles having the desired integral sheen employing either natural or synthetic pearl essence. The conventional pearl essence pigments are employed in the invention, such as those described above, together with the plastic materials conventionally employed, which in present practice are preferably hardenable synthetic organic resins. One of the most desirable resinous materials in use today is a polyester resin, preferably polymerizable unsaturated polyester resin which is cross-linked with a suitable monomer such as a vinyl monomer.

Employing the preferred materials, it has been found that the most desirable pigment orientation is obtained with the application of a voltage sufficient to produce about 100 microamperes or greater of electric current flowing through the fluid mixture of plastic and pigment. The current producing the most desirable orientation may vary with variations in the materials, and the optimum current is readily ascertained by simply varying the current and noting the appearance of the articles produced. The voltage applied to produce such current flow depends upon the electrical resistance of the mixture.

The preferred plastic materials are synthetic organic resins which are hardenable to produce solid articles which are transparent or translucent. They are preferably polymerizable thermosetting or thermoplastic resins, including the polyester resins, resins from polymerizable ethylenic or monoolefinic compounds which contain the terminal group $CH_2=C<$ such as vinyl compounds, styrene, substituted styrenes, and acrylics, and epoxy resins. It is also contemplated that the modified natural resins may be employed as the plastic material, such as the cellulose esters and ethers. These materials, which are all well known in the art, include the amides, esters and nitriles of acrylic, chloracrylic and alkacrylic acids, preferably the methyl and ethyl esters of alpha alkyl acrylic acid, the curable polyester resin compositions which are condensation products of dibasic acids and glycols, cross-linked with a polymerizable monomer such as a vinyl compound, and the reaction products of polyphenolic compounds and epoxy compounds, such as epichlorhydrin, cured with an amine or acid hardening agent. The modified natural cellulose materials include cellulose acetate, cellulose nitrate, and ethyl cellulose.

The further preferred plastic materials are the hardenable unsaturated polyester compositions which initially contain an advanced unsaturated linear polyester containing unesterified carboxyl groups, dissolved in and copolymerizable with a liquid monomeric polymerizable ethylenic compound containing the terminal group $CH_2=C<$. The polyester is prepared from an unsaturated dibasic acid, such as maleic or fumaric acid, and a glycol such as ethylene glycol or diethylene glycol. The cross-linking agent may be a polymerizable compound such as styrene, vinyl acetate, methyl methacrylate, diallyl phthalate, diallyl fumarate or triallyl cyanurate. The compositions are initially liquid and are curable to a thermoset solid. The polymerization or curing conditions are controlled by selection of a suitable peroxide catalyst and accelerator such as a cobalt compound. The materials and manner of regulating the polymerization are well known to the art. The time required for gelling or initial setting can be closely controlled, as can the time required for complete cure. Hardening of the resin may take place at normal or room temperatures, or the cure may be accelerated by increasing the temperature.

The proportion of pearl essence pigment may vary from 0.005% to 20% by weight of the hardenable plastic material, and it is generally preferred to employ a proportion of about 0.1–10%. The quantity of pigment employed will depend upon the types of materials and upon the effects desired.

The following example is an illustration of preferred embodiments of the invention. It will be understood that the invention is not limited to the example, nor to the materials, proportions, conditions and procedures described therein.

EXAMPLE

A commonly used composition of an unsaturated polyester resin containing an accelerator and catalyst, adjusted to give a known gel time, and pearl essence pigment is as follows:

Table

| | Parts by weight |
|---|---|
| Unsaturated polyester resin composition | 100 |
| Cobalt naphthenate (accelerator) (6% cobalt) | 0.1 |
| Pearl essence pigment | 2 |
| Methyl ethyl ketone peroxide, 60% in dimethyl phthalate (catalyst) | 2 |

The unsaturated polyester resin composition may contain an advanced unsaturated linear polyester in a proportion of about 60 to 90% by weight, and monomeric styrene in a proportion of about 40% to 10% by weight. A number of commercially available compositions which produce light-transmitting solid resin bodies may be employed, such as Paraplex 602 (Rohm & Haas), Selectron 5026 and 5150 (Pittsburgh Plate Glass Company), and Laminac 4120 (American Cyanamid).

The pearl essence pigment may constitute natural pearl essence from herring fish scales, or synthetic pearl essence such as lead carbonate, or lead carbonate mixed with zinc carbonate. Various commercial materials are available, such as natural pigment identified as PBS Mearlmade (The Mearl Corporation), and natural pearl essence "Brilliant" POL (Rona Laboratories, Inc.). A representative synthetic pigment mixture of lead carbonate and zinc carbonate is Mearl pearl essence YPG.

The gel time under atmospheric conditions is preferably adjusted in the range of 1 to 20 minutes, and for the above composition, is about 7–8 minutes adjustable within 10–20 seconds, employing Selectron 5026 as the resin with Mearl pearl essence YPG.

Figure 3:
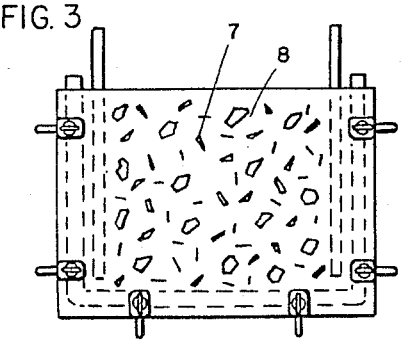
Figure 3 is a view like Figure 2 illustrating pigment particles dispersed at random in a plastic substance.
Figure 4:
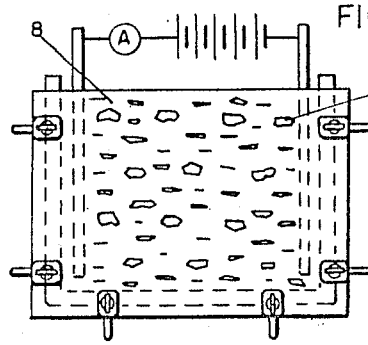
Figure 4 is a view like Figures 2 and 3 illustrating the orientation or alignment of the pigment particles in the plastic according to the invention.
Figure 5:
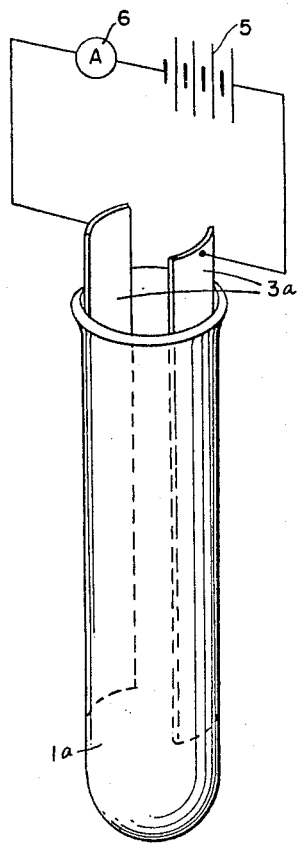
Figure 5 is a perspective view of a cell for casting plastic rods.
Figure 6:
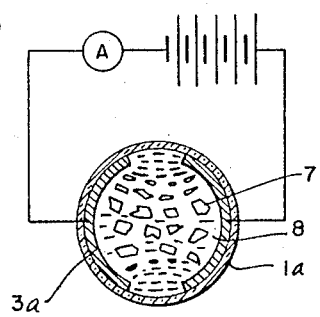
Figure 6 is a horizontal section of the cell of Figure 5, illustrating the orientation of the pigment particles.

The above composition is thoroughly mixed and poured into a sheet casting cell as illustrated in Figures 1 through 4, or a cell for casting rods as illustrated in Figures 5 and 6. The cell of Figure 1 is constructed of two glass plates 1 separated by a rubber gasket 2. Electrically conductive electrodes 3 are placed within the cell at the opposite ends thereof, and the parts of the cell are secured together by clamps 4. The electrodes 3 are connected through a source of high voltage direct current 5, with the ammeter 6 in the circuit.

In the apparatus of Figure 5, the cell is formed within a glass tube 1a. Plate electrodes 3a having the same curvature as the tube are inserted at opposite sides of the tube. The electrodes are connected to the high voltage direct current source 5 with the ammeter 6 in the circuit.

The pearlescent pigment particles 7 are initially dispersed throughout the liquid light-transmitting plastic 8 at random and with no orientation, as illustrated in Figure 3. The high voltage source 5 is connected to the electrodes, and current flows through the fluid mixture in the cell producing orientation or alignment of the pigment particles 7 as illustrated in Figures 4 and 6, with the long axes of the particles aligned in the path or direction of flow of the electric current.

Employing the above-described materials, particularly Selectron 5026 and Mearl pearl essence YPG, about 1000 volts per inch separating the electrodes are required to maintain a current of 100 microamperes with 1 square inch cross-section. Thus, with a space between the glass plates 1 as shown in Figure 1 of ⅛ inch, producing a sheet of this thickness, with a cell depth of 10 inches, and with the electrodes spaced at 10 inches apart, 10,000 volts are employed to produce 125 microamperes of direct current flow. Alignment commences when the voltage is applied and is complete within 10–60 seconds.

Since the pigment particles 7 are aligned in the direction of current flow, the alignment is in parallel with the inner surfaces of the glass plates 1 or cell walls as shown in Figure 4 and with the wide surfaces of the resulting sheet. In the method of Figure 6, the alignment is parallel to the end surfaces of the resulting rod. By suitable arrangement of the electrodes, the alignment can be altered to produce various effects.

When the resin gels or reaches a semi-solid or solid state, the electrical connection to the voltage source is broken. The voltage may be removed shortly before gelation so long as the particles substantially retain their positions. Removal of the voltage may be based on a predetermined elapsed time or on observation of the physical condition of the mixture. Gelation may also be induced or accelerated such as by raising the temperature applied, e.g., by immersion in a warm bath, after the desired alignment is obtained in the fluid mass. The orientation of the pigment particles is maintained by the solidified plastic.

The cast article is then allowed to cure to a rigid state for easy removal from the cell. For example, the above composition may be cured for 30 minutes at 90° C. or for 60 minutes at 60° C. These curing times produce articles which are ready for use without further curing.

The articles are removed from the cells, and the adhering electrodes 3 or 3a are removed. Articles such as button blanks are produced from the sheet materials obtained in the method illustrated in Figures 1–4 by stamping or sawing the sheet material so that the prominent surfaces of the resulting articles correspond to the wide sides of the sheet initially formed at the inner surfaces of the glass plates 1. The rods produced as illustrated in Figures 5 and 6 may be sawed perpendicularly to the axis of the rod, to produce circular blanks. The prominent surfaces are those corresponding to cross sections of the rod, parallel to the ends of the rod.

The configuration of the cell and the shape and dimensions of the resulting article can be altered in a manner appropriate to the results desired. The orientation is obtained with both synthetic and natural pearl essence pigment and with mixtures of the two.

In like manner, other plastic materials are employed in fluid condition as conventional for casting the articles. For example, the pigment may be dispersed in a partially polymerized methyl alpha methacrylate. The voltage is applied while the resin polymerizes or cures to a semi-solid or solid state, at which time application of the voltage is discontinued.

The invention thus provides an improved method or process for producing controlled orientation of pearl essence pigment in plastic articles, simulating the appearance of mother-of-pearl. The pigment particles are highly oriented, and the type of orientation can be varied to produce different attractive visual effects. The articles have exceptional luster and pearly appearance. The method is convenient, rapid, economical and reliable, and only simple standard equipment is required. The conditions may be altered as desired to produce a variety of useful articles.

The invention is hereby claimed as follows:

1. In a method of casting plastic articles having integral sheen, wherein light-reflecting lamellae are dispersed in hardenable plastic material, the improvement which comprises applying a direct current voltage to said dispersion while fluid to produce an electric current therein, and maintaining said voltage until gelation of said dispersion.

2. The method defined in claim 1 wherein said voltage produces in said fluid dispersion an electric current of at least about 100 microamperes.

3. The method of casting plastic articles having integral sheen which comprises dispersing light-reflecting lamellae in hardenable fluid synthetic organic resin, applying a direct current voltage to said dispersion while fluid to produce an electric current therein, and maintaining said voltage until gelation of said dispersion.

4. The method of casting plastic articles having integral sheen which comprises dispersing natural pearl essence in hardenable fluid polyester resin, applying a direct current voltage to said dispersion while fluid to produce an electric current therein, and maintaining said voltage until gelation of said dispersion.

5. The method of casting plastic articles having integral sheen which comprises dispersing synthetic pearl essence in hardenable fluid polyester resin, applying a direct current voltage to said dispersion while fluid to produce an electric current therein, and maintaining said voltage until gelation of said dispersion.

6. The method of casting plastic articles having integral sheen which comprises dispersing light-reflecting lamellae in polymerizable fluid unsaturated polyester resin, applying a direct current voltage to said dispersion while fluid to produce an electric current therein, whereby said lamellae are oriented in the direction of current flow, and maintaining said voltage until gelation of said dispersion.

7. The method of casting plastic articles having integral sheen which comprises dispersing light-reflecting lead carbonate lamellae in polymerizable fluid unsaturated polyester resin, applying to said dispersion while fluid a direct current voltage producing an electric current of at least about 100 microamperes, and maintaining said voltage until gelation of said dispersion.

References Cited in the file of this patent
UNITED STATES PATENTS

| | | |
|---|---|---|
| 1,918,848 | Land et al. | July 18, 1933 |
| 2,480,750 | Leary | Aug. 30, 1949 |